United States Patent [19]

Auer et al.

[11] Patent Number: 5,173,808

[45] Date of Patent: Dec. 22, 1992

[54] OPTICAL FILTER

[75] Inventors: Willem F. Auer, Townshend, Vt.; John A. Brown, Berkeley Heights; William A. Thornton, Cranford, both of N.J.

[73] Assignee: Omega Optical Inc., Vt.

[21] Appl. No.: 335,831

[22] Filed: Apr. 10, 1989
(Under 37 CFR 1.47)

[51] Int. Cl.⁵ .............................................. G02B 5/20
[52] U.S. Cl. .................................... 359/722; 359/588
[58] Field of Search ............... 350/438, 311, 166, 439;
359/722, 588, 723

[56] References Cited

U.S. PATENT DOCUMENTS

4,933,110 6/1990 Tucker ................................ 350/311
4,935,166 6/1990 Lee et al. ........................... 350/311

Primary Examiner—Scott J. Sugarman
Attorney, Agent, or Firm—Anthony J. Casella; Gerald E. Hespos

[57] ABSTRACT

A filter is provided for blocking a major portion of the light impinging thereon but transmitting three narrow spectral pass bands of light having selected wavelengths. The number of pass bands and the wavelengths included in each pass band are selected in accordance with environmental or military conditions dictating the wavelengths of light that need to be filtered. The transmitted narrow spectral pass bands preferably are spaced approximately equally about the CIE chromaticity diagram. The resulting filter enables exceptional seeing and color differentiation while positively blocking broad ranges of potentially injurious light from passing therethrough.

17 Claims, 8 Drawing Sheets

WAVELENGTH

OPTICAL FILTER

BACKGROUND OF THE INVENTION

High intensity light, including laser light, can permanently damage vision. The potentially injurious light may be emitted by military weapons or by industrial equipment. In some instances the wavelength of the potentially injurious light is known. In these instances, eyewear has been employed to filter a narrow band or "notch" of spectral wavelengths corresponding to the objectionable light. Notch filters may be acceptable in some industrial workplaces where the objectionable light can be fairly accurately predicted. However, eye damage may occur in situations where the filtering abilities of the prior art notch filter eyewear do not closely match the wavelength of the objectionable light.

Other prior art protective "broadband" filter eyewear has reduced the amount of all wavelengths of light passing therethrough. However, these broadband filters result in poor seeing, including reduced visual acuity and poor color differentiation.

Laser weapons capable of causing severe and permanent eye damage have been developed in recent years. The wavelengths of some such weapons have been publicly reported. However, laser weapons emitting light of other wavelengths are possible and may be under development. The inability to accurately predict the wavelength of laser light that may be developed and/or employed under combat conditions makes it difficult to develop an acceptable notch filter for blocking that particular wavelength of light. Prior art broadband filters are unacceptable for most combat situations because of the poor seeing associated with such filters.

It has generally and intuitively been assumed that the quality of vision varies directly with the amount of light available to the viewer. However, these assumptions are not correct. In fact some wavelengths of ambient light actually degrade the quality of vision. William A. Thornton has taught that illumination for good seeing by human beings requires only three "prime" colors which define narrow spectral bands centered approximately at 450 nanometers, 530 nanometers, and 610 nanometers. Thornton has developed illumination to generate light mainly at these three narrow prime color spectral wavelength bands. Although the light produced by the Thornton illumination is "dim", images seen in this "dim" light actually appear quite bright and yield accurate color differentiation. Thus, the Thornton illumination teaching enables efficient light to be produced with substantially reduced power.

Thornton's teaching is further presented in U.S. Pat. No. 3,877,797 which proposes a pair of goggles made from didymium glass lenses to remove 580 nanometer light and a porphyrin chelate film to remove 490 nanometer light, while passing the remainder of the visible spectrum. Scenes viewed through these goggles appear approximately as bright as the same scene viewed without the goggles. In particular, daylight viewed through the goggles appeared "white" and color discrimination through the goggles was equivalent to color discrimination without the goggles.

The goggles shown in U.S. Pat. No. 3,877,797 are of some intellectual interest, but would be of limited usefulness in an industrial work place, and would be of virtually no use in the above described military applications intended to protect against laser weapons. In particular, the goggles shown in U.S. Pat. No. 3,877,797 do not block a sufficient amount of light to prevent eye damage to a viewer in many combat situations or industrial work places. Consequently, the goggles shown in U.S. Pat. No. 3,877,797 have little practical application.

In view of the above, it is an object of the subject invention to provide protective eyewear that blocks substantial portions of approaching light, while simultaneously enabling good seeing.

Another object of the subject invention is to provide filters which permit only selected narrow spectral wavelength bands of light to pass therethrough while still enabling good seeing.

It is an additional object of the subject invention to provide a broadband filter that permits three narrow spectral wavelength bands to pass therethrough.

A further object of the subject invention is to provide filtering lenses which block over 90% of the visible spectrum of light but enable good seeing.

SUMMARY OF THE INVENTION

The subject invention takes advantage of the prior art teaching that good seeing is not necessarily dependent upon the amount of light impinging upon the eye. In particular, the subject invention is directed to a filter that effectively blocks out major spectral components of incoming light while permitting two-four selected narrow spectral "pass bands" of light to be transmitted therethrough. The filter is uniquely constructed to permit passage of narrow spectral wavelength bands that will permit good seeing. Additionally, the major spectral components of light that are blocked by the subject filter are selected to include potentially harmful light wavelengths that may be encountered in an industrial work place or a combat encounter. Thus, the filter of the subject invention substantially prevents damage to the eye while enabling good seeing.

The number and the wavelength of the narrow spectral bands which are permitted to pass through the subject filter are selected in accordance with conditions of the environment in which the filter is used. To ensure good seeing and adequate color differentiation, it is desirable for the filter to permit passage of narrow spectral bands which define wavelengths that are disposed approximately equally around the CIE chromaticity diagram. The spectral bands have wavelength widths of less than 50 nanometers and preferably equal to approximately 10–20 nanometers as measured at 50% of the maximum radiation. Thus, the filter is operative to transmit substantially less than 10% of ambient light, with the more than 90% of blocked light being selected to include the potentially injurious light in the particular environment in which the filter is employed.

Despite transmitting only a very small percentage of the incident light, the subject filters provide astonishingly clear vision with an unmistakable perception of brightness. Color perception, however, may vary slightly depending upon the particular number and wavelengths of the pass bands selected. Color perception and differentiation have been found to be good in filters constructed to transmit three spectral bands corresponding to the above described prime colors and being centered about wavelengths of approximately 450 nanometers, 530 nanometers, and 610 nanometers. However, at least one of these spectral pass bands includes the wavelength that certain laser weapons have been reported to use. Thus, filters constructed to transmit three spectral bands substantially corresponding to the above described prime colors will have limited applicability in combat situations. Filters constructed to transmit two or three other narrow spectral bands approximately equally spaced around the CIE chromaticity diagram, but differing from the above described prime colors, have been found to provide exceptional seeing and good color vision despite blocking over 90% of the incident light. For example, a filter having narrow pass bands centered at approximately 445, 520 and 610 nanometers will provide exceptional seeing with full color vision, while still protecting against known wavelengths for laser weapons.

The filter of the subject invention may be made by applying plural refractive layers to a single substrate or by making several individual thin filters and laminating them into a parallel array. The filtering materials may be evaporated onto a substrate or may be formed with dyes appropriately applied to or incorporated into a substrate material.

The filter of the subject invention may be incorporated into an appropriate apparatus for protecting vision. In the typical embodiment the filters will be incorporated into goggles, a face shield or other head gear worn by industrial technicians or military personnel. The goggles or face shield may be constructed to securely and permanently receive the filter of the subject invention. Alternatively, the goggles or face shield may be constructed to removably and replaceably receive the filter. The removability of the filter enables filters having different spectral pass bands to be interchanged in accordance with a perceived environmental threat. For example, military personnel may be provided with goggles and a plurality of filters selectively mountable therein. The filters inserted into the goggles may be selected in accordance with characteristics of a laser weapon employed by enemy personnel.

DETAILED DESCRIPTION OF THE PREFERRED EMBODIMENTS

Figure 1:
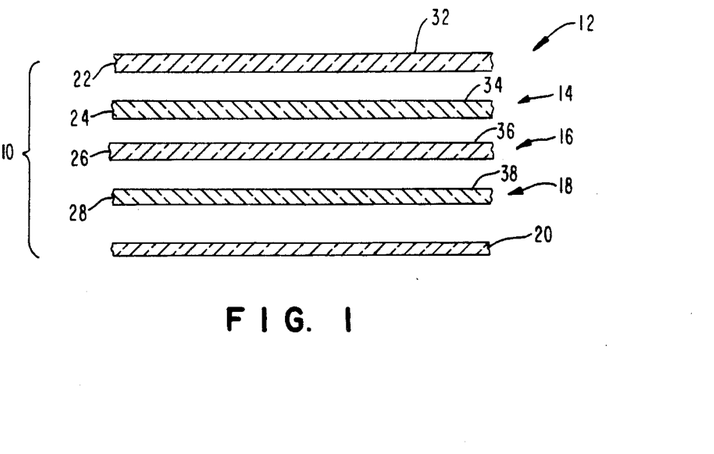
FIG. 1 is an exploded schematic cross-sectional view of a filter in accordance with the subject invention.
Figure 2:
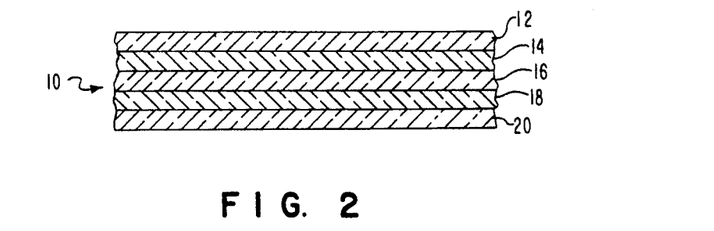
FIG. 2 is a schematic cross-sectional view of a filter in accordance with the subject invention.

The tristimulus filter of the subject invention is indicated generally by the numeral 10 in FIG. 1. The filter 10 comprises first through fourth band stop filters 12, 14, 16 and 18 and an infrared filter 20 which are laminated into face-to-face relationship with one another as shown in FIG. 2. The respective band stop filters 12-18 each comprise a substrate 22-28 respectively. The substrates 22-28 have multi-layer refractive coatings 32-38 respectively applied thereto. The multi-layer refractive coatings 32-38 may be applied to the substrates 22-28 respectively by evaporation or other coating techniques that are known to the person skilled in the filter art.

Figure 3:
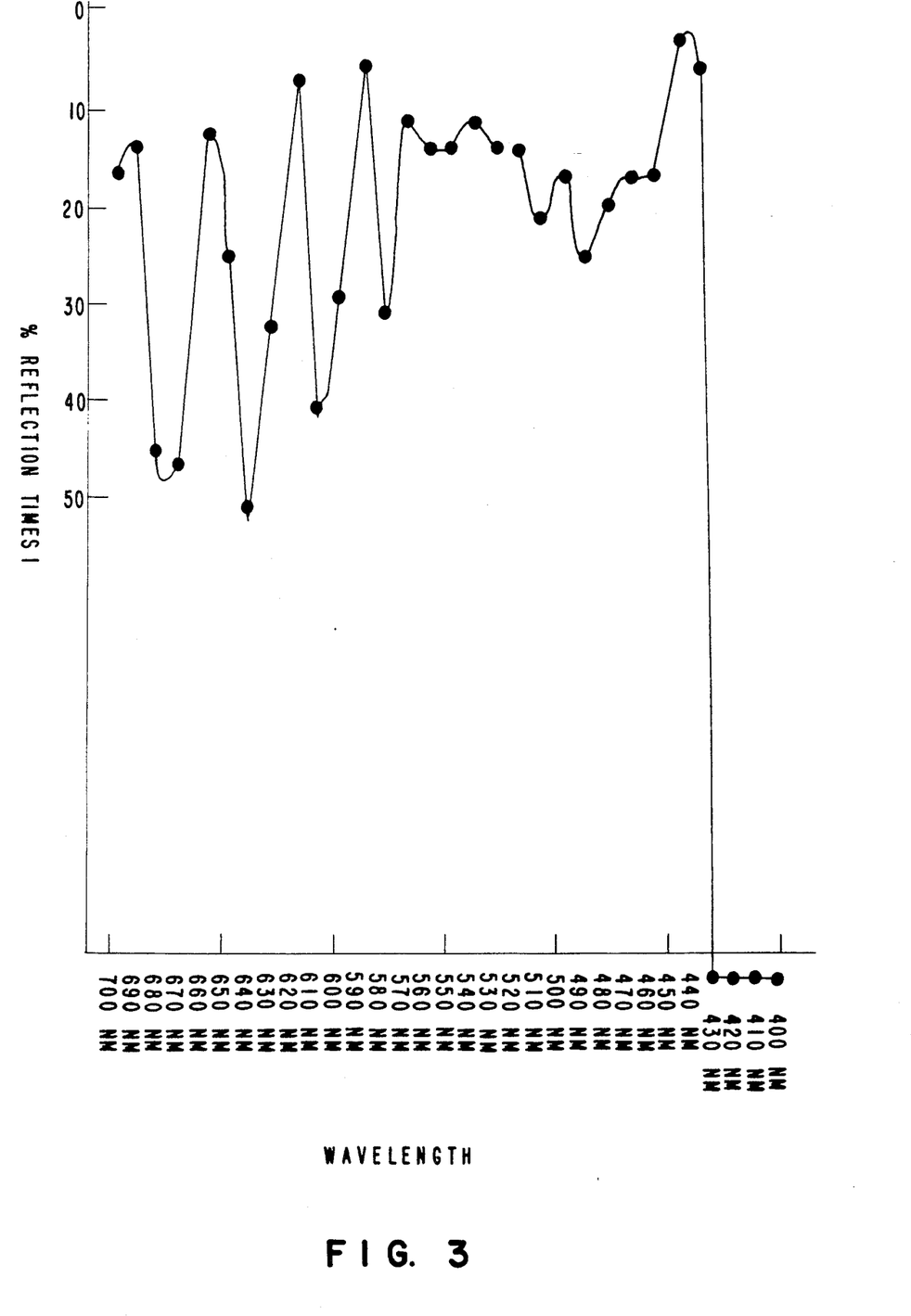
FIG. 3 is a graph showing a first band stop filter for incorporation into the filter of the subject invention.

The respective band stop filters 12-18 are made by applying successive layers of refractive coating material having refractive indices and thicknesses selected to achieve a desired cumulative filtering effect for the completed band stop filters 12-18. With reference to FIG. 3, the first band stop filter is formed with a substrate having a refractive index of 1.53, however the refractive index of the substrate is not critical. A total of nineteen filtering layers are successively applied to the substrate of the first band stop filter to give relatively high transmission everywhere except for light having wavelengths of 430 nanometers or less. The specific refractive indices and thicknesses of each layer comprising the coating on the first band stop filter are set forth in the following table.

| LAYER # | REF INDEX | THICKNESS, NM | QWOTS AT 410 |
|---|---|---|---|
| | FIRST BAND STOP FILTER | | |
| 1 | 2.35 | 218.1 | 5 |
| 2 | 1.8 | 170.8 | 3 |
| 3 | 2.35 | 130.9 | 3 |
| 4 | 1.35 | 227.8 | 3 |
| 5 | 2.35 | 130.9 | 3 |
| 6 | 1.35 | 227.8 | 3 |
| 7 | 2.35 | 130.9 | 3 |
| 8 | 1.35 | 227.8 | 3 |
| 9 | 2.35 | 130.9 | 3 |
| 10 | 1.35 | 227.8 | 3 |
| 11 | 2.35 | 130.9 | 3 |
| 12 | 1.35 | 227.8 | 3 |
| 13 | 2.35 | 130.9 | 3 |
| 14 | 1.35 | 227.8 | 3 |
| 15 | 2.35 | 130.9 | 3 |
| 16 | 1.35 | 227.8 | 3 |
| 17 | 2.35 | 130.9 | 3 |
| 18 | 1.8 | 170.8 | 3 |
| 19 | 2.35 | 218.1 | 5 |

Figure 4:
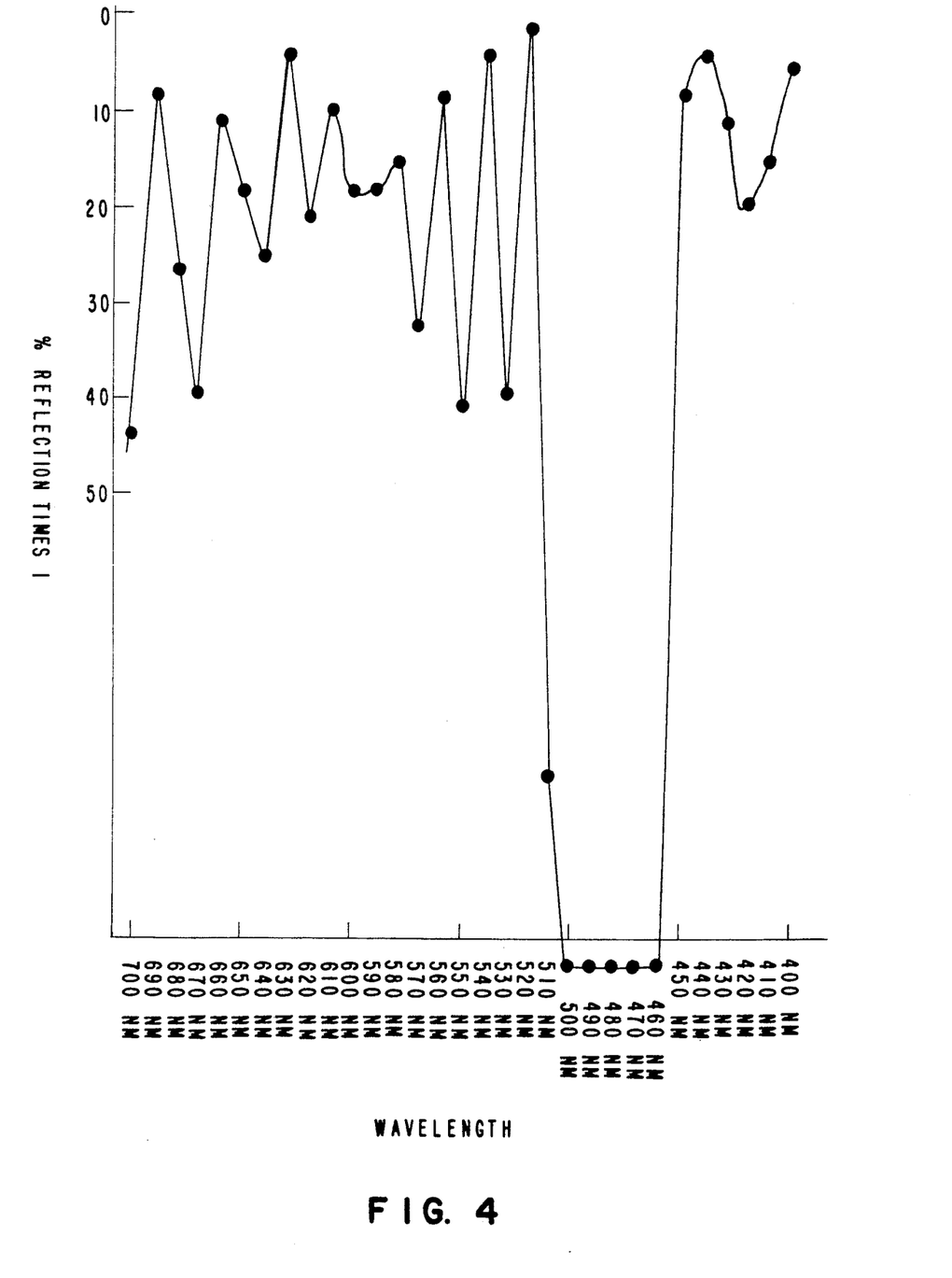
FIG. 4 is a graph showing a second band stop filter for incorporation into the filter of the subject invention.

The second band stop filter 14 comprises a substrate 24 to which nineteen layers of refractive material are successively applied to define a filter coating having relatively high transmission peaks across the spectrum except for light with wavelengths between 460 and 510 nanometers. The respective layers applied to the substrate of the second filter are set forth in the following table.

| LAYER # | REF INDEX | THICKNESS, NM | QWOTS AT 480 |
|---|---|---|---|
| | SECOND BAND STOP FILTER | | |
| 1 | 2.35 | 240 | 4.7 |
| 2 | 1.8 | 200 | 3 |
| 3 | 2.35 | 153.2 | 3 |
| 4 | 1.35 | 266.7 | 3 |
| 5 | 2.35 | 153.2 | 3 |
| 6 | 1.35 | 266.7 | 3 |
| 7 | 2.35 | 153.2 | 3 |
| 8 | 1.35 | 266.7 | 3 |
| 9 | 2.35 | 153.2 | 3 |
| 10 | 1.35 | 266.7 | 3 |
| 11 | 2.35 | 153.2 | 3 |
| 12 | 1.35 | 266.7 | 3 |
| 13 | 2.35 | 153.2 | 3 |

SECOND BAND STOP FILTER (continued)

| LAYER # | REF INDEX | THICKNESS, NM | QWOTS AT 480 |
|---------|-----------|---------------|--------------|
| 14 | 1.35 | 266.7 | 3 |
| 15 | 2.35 | 153.2 | 3 |
| 16 | 1.35 | 266.7 | 3 |
| 17 | 2.35 | 153.2 | 3 |
| 18 | 1.8  | 200   | 3 |
| 19 | 2.35 | 240   | 4.7 |

It will be noted that the respective thicknesses of the alternate layers successively applied to the substrate 24 of the second band stop filter are different from the thicknesses of the layers applied to the substrate 22 of the first band stop filter as set forth above.

Figure 5:
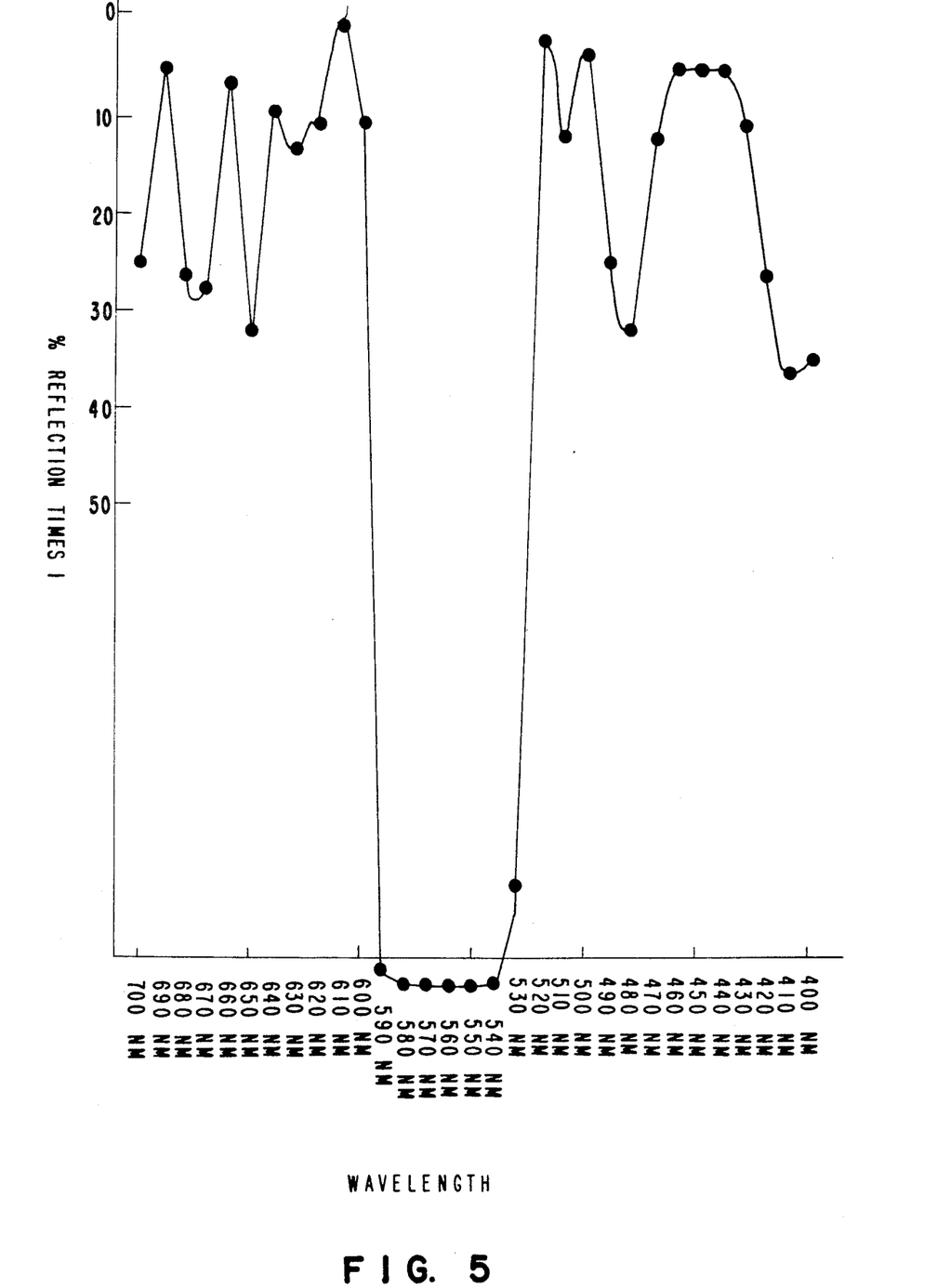
FIG. 5 is a graph showing a third band stop filter for incorporation into the filter of the subject invention.

The third band stop filter 16 comprises a total of nineteen layers to define the filter coating 36 applied to the substrate 26. The refractive indies and the thicknesses of the layers applied to the substrate 26 to define the coating 36 of the third band stop filter 16 are set forth in the following table.

THIRD BAND STOP FILTER

| LAYER # | REF INDEX | THICKNESS, NM | QWOTS AT 560 |
|---------|-----------|---------------|--------------|
| 1  | 2.35 | 297.9 | 5 |
| 2  | 1.8  | 233.3 | 3 |
| 3  | 2.35 | 178.9 | 3 |
| 4  | 1.35 | 311.1 | 3 |
| 5  | 2.35 | 178.9 | 3 |
| 6  | 1.35 | 311.1 | 3 |
| 7  | 2.35 | 178.9 | 3 |
| 8  | 1.35 | 311.1 | 3 |
| 9  | 2.35 | 178.9 | 3 |
| 10 | 1.35 | 311.1 | 3 |
| 11 | 2.35 | 178.9 | 3 |
| 12 | 1.35 | 311.1 | 3 |
| 13 | 2.35 | 178.9 | 3 |
| 14 | 1.35 | 311.1 | 3 |
| 15 | 2.35 | 178.9 | 3 |
| 16 | 1.35 | 311.1 | 3 |
| 17 | 2.35 | 178.9 | 3 |
| 18 | 1.8  | 233.3 | 3 |
| 19 | 2.35 | 297.9 | 5 |

It will be noted that the thicknesses of the respective layers shown in the preceding table are different from the thicknesses of the layers of refractive material applied to the first and second band stop filters. As shown in FIG. 5, the third band stop filter 16 will transmit broad areas of the spectrum, but will substantially block light having wavelengths of approximately 530-590 nanometers.

Figure 6:
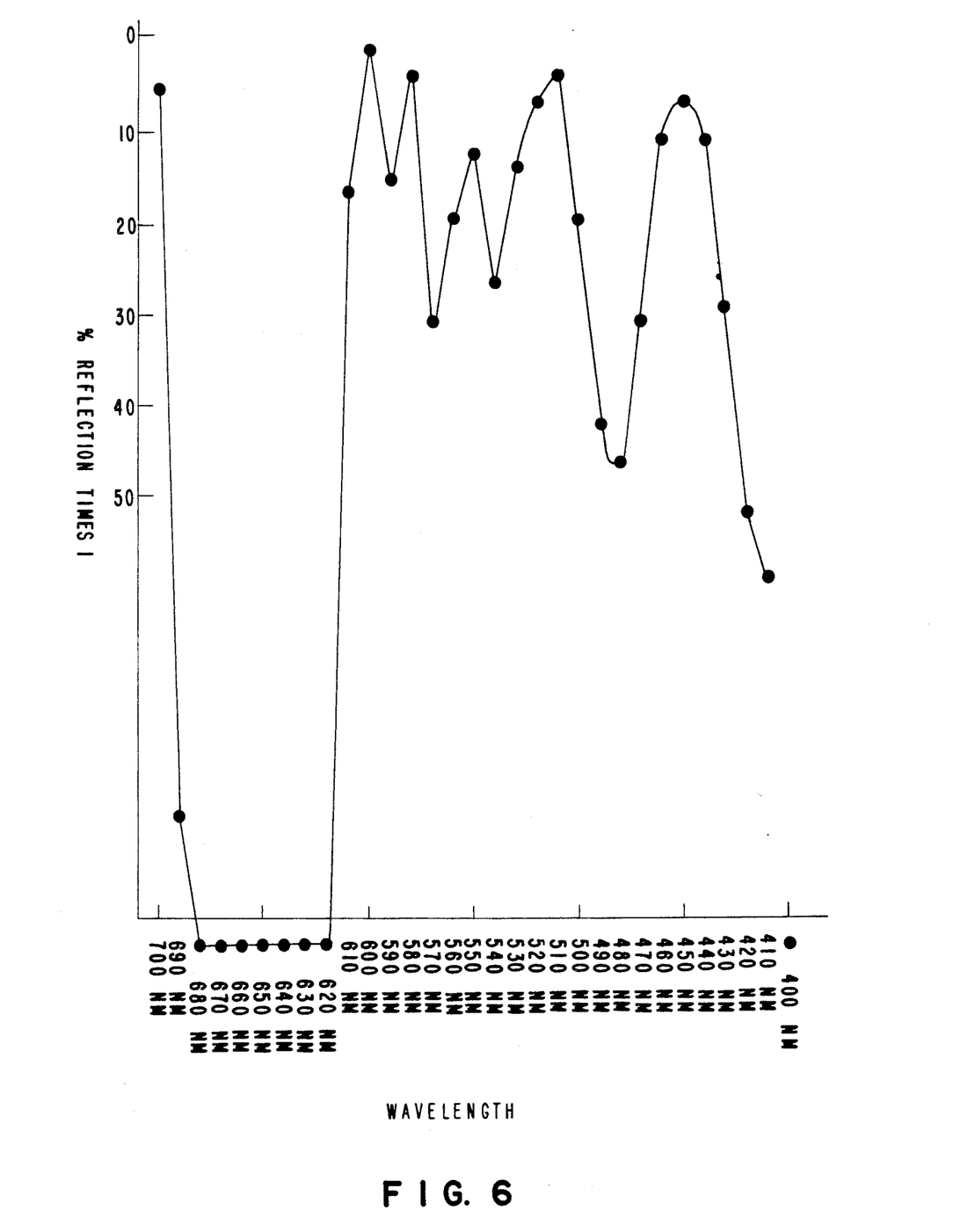
FIG. 6 is a graph showing a fourth band stop filter for incorporation into the filter of the subject invention.

The fourth band stop filter 18 comprises the substrate 28 and nineteen layers of refractive coating material applied thereto as set forth in the following table.

FOURTH BAND STOP FILTER

| LAYER # | REF INDEX | THICKNESS, NM | QWOTS AT 650 |
|---------|-----------|---------------|--------------|
| 1  | 2.35 | 345.7 | 5 |
| 2  | 1.8  | 270.8 | 3 |
| 3  | 2.35 | 207.4 | 3 |
| 4  | 1.35 | 361.1 | 3 |
| 5  | 2.35 | 207.4 | 3 |
| 6  | 1.35 | 361.1 | 3 |
| 7  | 2.35 | 207.4 | 3 |
| 8  | 1.35 | 361.1 | 3 |
| 9  | 2.35 | 207.4 | 3 |
| 10 | 1.35 | 361.1 | 3 |
| 11 | 2.35 | 207.4 | 3 |
| 12 | 1.35 | 361.1 | 3 |
| 13 | 2.35 | 207.4 | 3 |
| 14 | 1.35 | 361.1 | 3 |
| 15 | 2.35 | 207.4 | 3 |
| 16 | 1.35 | 361.1 | 3 |
| 17 | 2.35 | 207.4 | 3 |
| 18 | 1.8  | 270.8 | 3 |
| 19 | 2.35 | 345.7 | 5 |

It will be noted that the thicknesses of the refractive material applied to the substrate 28 differ from the thicknesses set forth in the preceeding tables. As a result of theses differences the filter 18 will have relatively high transmission across broad areas of the spectrum, but will substantially block light having wavelengths in the range of 620-680 nanometers as shown in FIG. 6.

Figure 7:
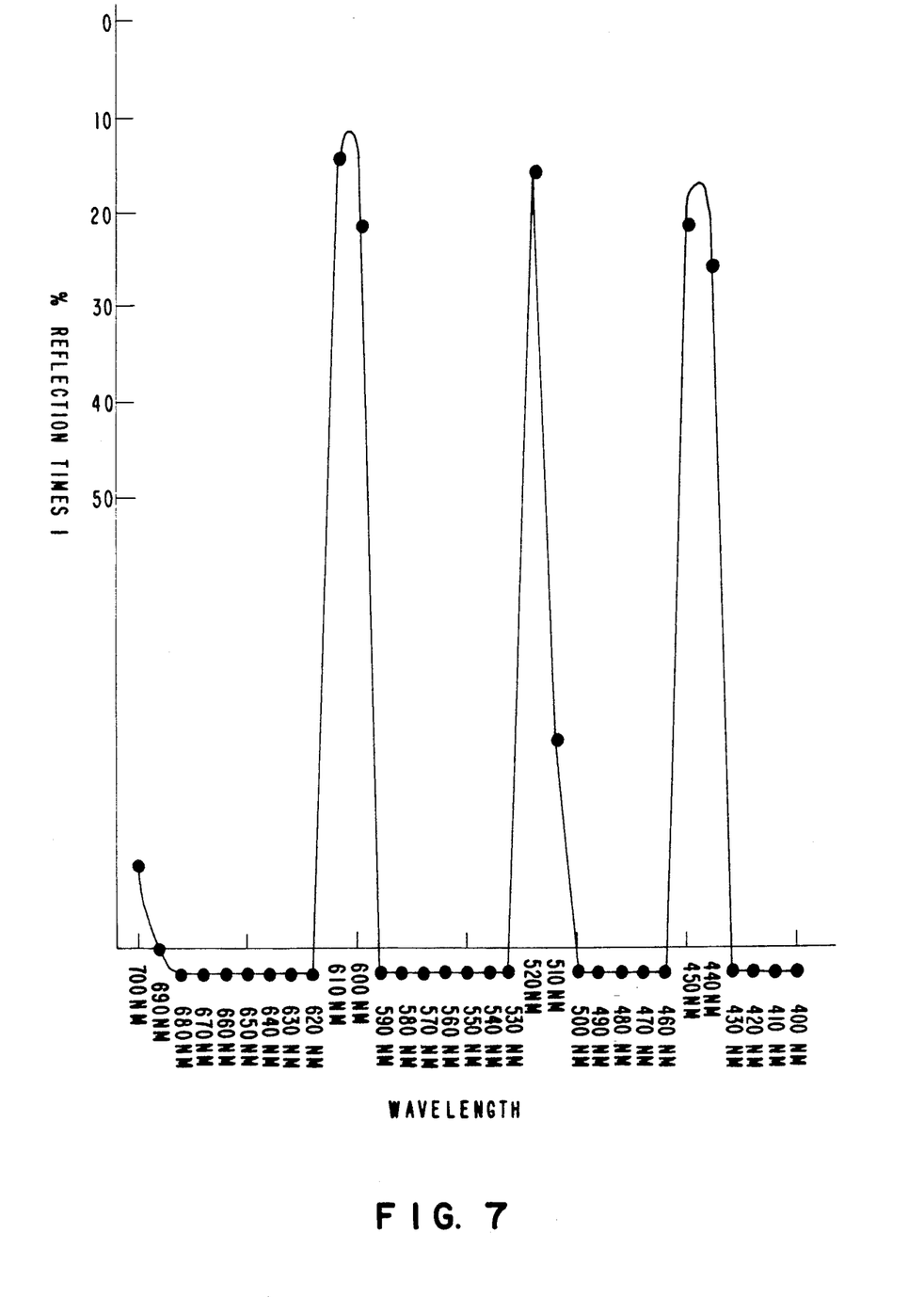
FIG. 7 is a graph showing the combined effect of the filters graphed in FIGS. 3-6.
Figure 8:
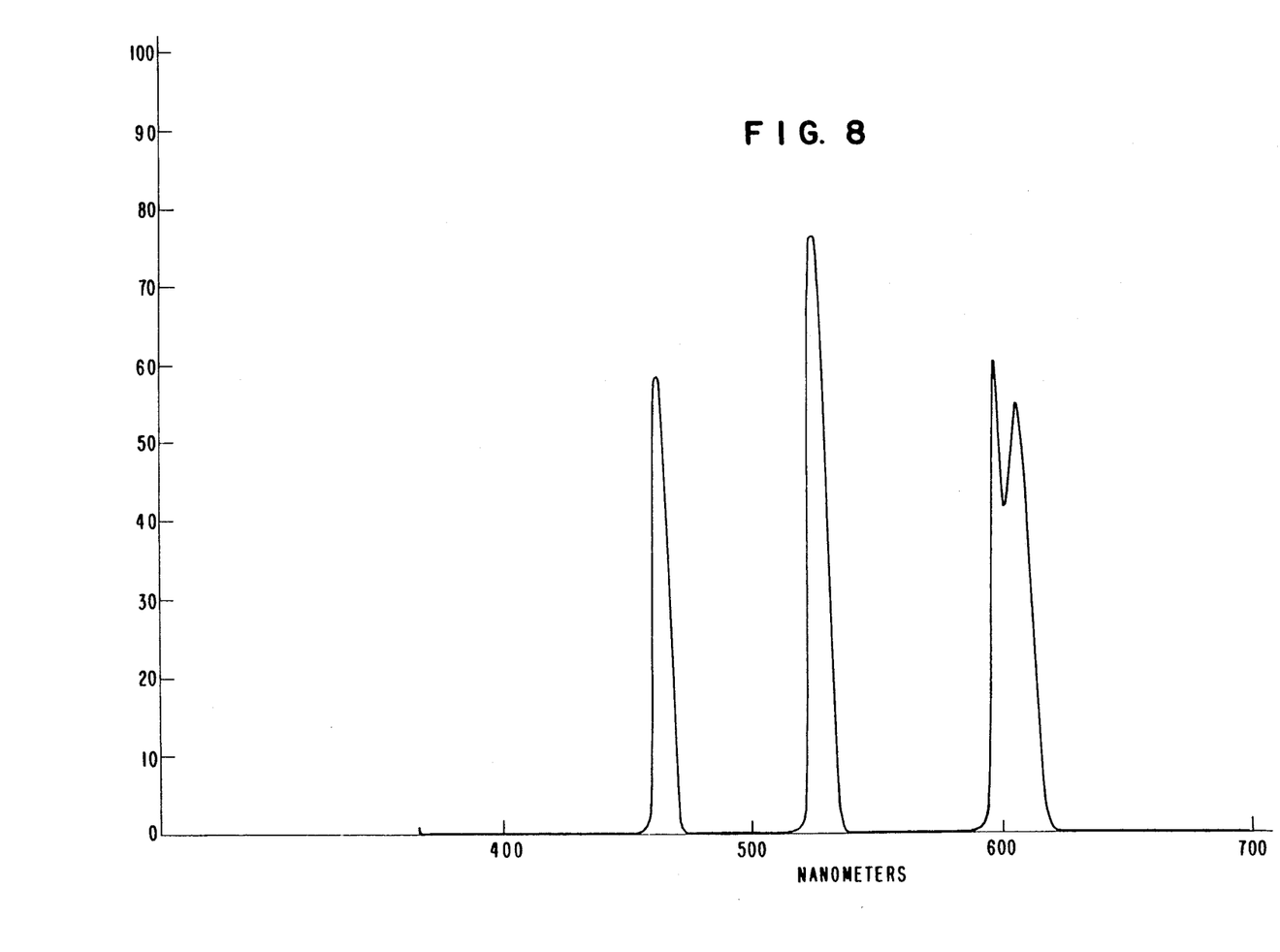
FIG. 8 is a graph showing light transmission for an alternate filter.
Figure 9:
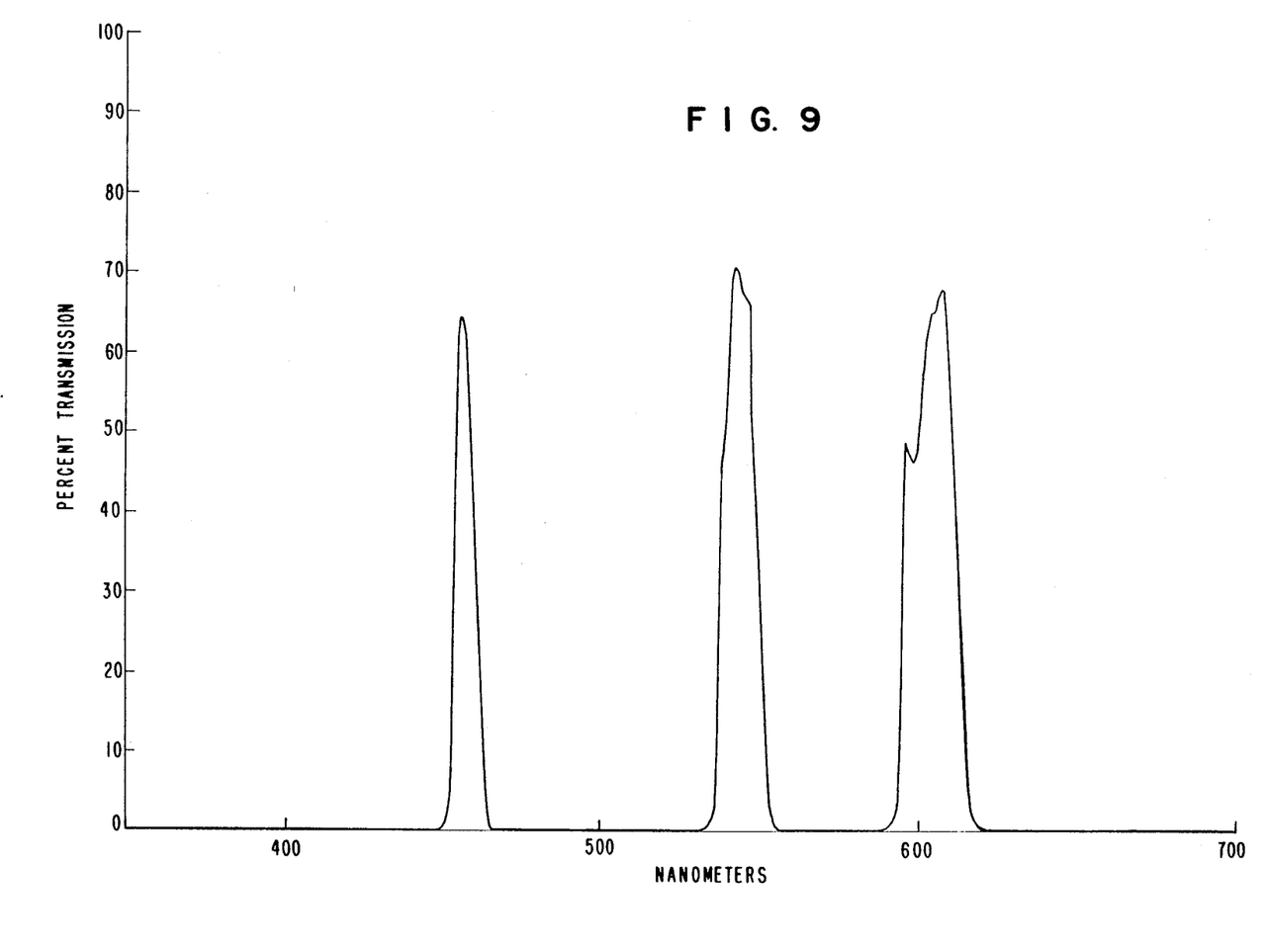
FIG. 9 is a graph showing light transmission for a second alternate filter.

The filter 10 is completed by laminating the separate first through fourth stop band filters 12-18 and the infrared filter 20 to one another as shown in FIG. 2. The resulting light transmitting capabilites of the filter 10 is shown in FIG. 7 which was created by superimposing the graphs shown in FIGS. 3-6. In particular, the filter 10 will substantially block light having wavelengths of less than 430 nanometers, 460-510 nanometers, 530-590 nanometers, and 620-680 nanometers. Light having wavelengths between these blocked areas will be transmitted through the filter. In particular, the transmitted light will define narrow spectral pass bands extending approximately from 440 to 450 nanometers, 510-520 nanometers and 600-610 nanometers. A pass band at about 700 nanometers will be blocked by the infrared filter 20. The width of the above identified pass bands measured at one-half maximum radiation will be in the range of 10-20 nanometers. These three narrow pass bands of light transmitted through the filter 10 will comprise only about 6% of the total incident light impinging upon the filter 10. However, the three spaced apart transmission pass bands will enable both superior seeing and excellent color differentiation because the pass bands are selected to be spaced approximately equally around the CIE chromaticity diagram as explained above. Other pass bands spaced equally about the CIE chromaticity diagram yield comparable results. FIGS. 8 and 9 show the light transmission for two other filters having pass bands slightly different from those in FIG. 7 to meet specified environmental or combat exigencies. It will be appreciated that the preceding teaching could be employed to create a filter having only two pass bands. Such a filter could provide enhanced protection and comparable vision if the pass bands are approximately opposite one another on the CIE chromaticity diagram.

Figure 10:
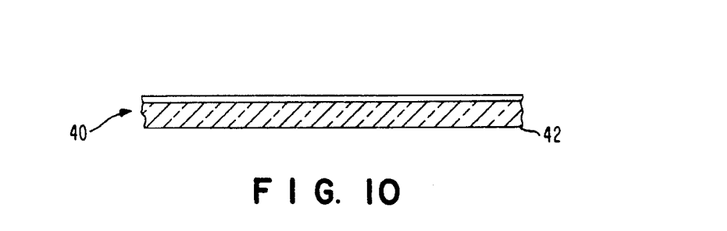
FIG. 10 is a schematic cross-sectional view of an alternate construction of the filter of the subject invention.

As an alternate to the filter construction depicted in FIGS. 1 and 2, the various layers described in the preceding tables could be applied to a single substrate. In particular, FIG. 10 shows a filter 40 having a substrate 42 to which the layers of refractive material set forth in the preceding tables are applied. The resulting light transmission characteristics for the filter shown in FIG. 10 can be made to be similar to those described above for the filters of FIGS. 1 and 2.

Figure 11:
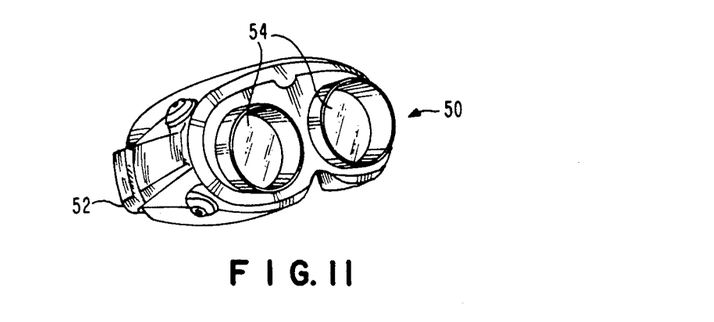
FIG. 11 is a perspective view of goggles which incorporate the filter of the subject invention.

The filter shown in FIGS. 1 and 2 or FIG. 3 may be incorporated into a pair of goggles indicated generally by the numeral 50 in FIG. 11. The goggles 50 comprise a support 52 into which the filter 54 is removably secured. In particular, the filter 54 may be selectively removed from the support 52 and replaced by a second filter which transmits a different plurality of narrow spectral wavelength bands for protecting against a different pattern of potentially injurious light.

In summary, a filter is provided which is operative to block substantially all incident light except for several narrow spectral wavelength bands of light. The bands of light transmitted through the filter preferably are spaced approximately equally around the CIE chromaticity diagram. In one preferred embodiment three pass bands of transmitted light preferably define widths of less than 50 nanometers measured at 50% maximum radiation and preferably are centered approximately at 445, 520 and 610 nanometers. The filter is constructed by applying a plurality of layers of refractive material on at least one substrate. For example, all of the refractive layers may be disposed on a single substrate. Alternatively, a plurality of substrates having filter coatings thereon may be laminated into an integral structure for filtering all but the specified plurality of narrow spectral pass bands of light wavelengths. The filter preferably is incorporated into an appropriate structure for protecting the eyes of industrial workers or military personnel. The filters may be permanently or removably mounted into goggles or other such eyewear which may be worn by the user. In the typical embodiment the filter will block at least 90% of the light impinging thereon.

While the invention has been described with respect to certain preferred embodiments, it is apparent that various changes can be made without departing from the scope of the invention as defined by the appended claims.

What is claimed is:

1. An optical filter comprising a substantially transparent substrate and a plurality of light filtering means for permitting transmission of a plurality of spectral wavelength pass bands of light therethrough and for blocking light having wavelengths outside said pass bands, the pass bands of light transmitted through said filter being centered approximately at 445 nanometers, 520 nanometers and 610 nanometers respectively.

2. A filter as in claim 1 comprising a single substrate and a plurality of refractive filtering layers successively applied thereto, said plurality of refractive filtering layers defining the plurality of light filtering means.

3. A filter as in claim 1 comprising a plurality of substrates, each of said substrates having a plurality of layers of refractive material applied thereto to define a stop band filter, said plurality of layers of refractive material defining the plurality of light filtering means, said stop band filters being laminated in face-to-face relationship with one another.

4. An optical filter comprising a substantially transparent substrate and a plurality of light filtering means for permitting transmission of a plurality of spectral wavelength pass bands of light therethrough and for blocking light having wavelengths outside said pass bands, said pass bands each define widths of less than 50 nanometers as measured at 50% maximum radiation.

5. A filter as in claim 4 wherein the filtering means permits transmission of three narrow bands of light.

6. A filter as in claim 5 wherein the bands of light transmitted through said filter are centered approximately at 445 nanometers, 520 nanometers and 610 nanometers respectively.

7. A filter as in claim 6 wherein the widths of the respective transmission bands are between about 10 nanometers and about 50 nanometers measured at approximately one half the maximum radiation transmission within each said band.

8. A filter as in claim 4 wherein the filtering means permits transmission of two narrow bands of light.

9. A filter as in claim 4 wherein the filtering means permits transmission of four narrow bands of light.

10. A filter as in claim 4 wherein the pass bands are spaced approximately equally about a CIE chromaticity diagram.

11. An optical filter comprising a substantially transparent substrate and a plurality of light filtering means for permitting transmission of a plurality of spectral wavelength pass bands of light therethrough and for blocking light having wavelengths outside said pass bands, the bands transmitted through said filter define wavelengths centered approximately at 450 nanometers, 530 nanometers and 610 nanometers.

12. An optical filter comprising a substantially transparent substrate and a plurality of light filtering means for permitting transmission of a plurality of spectral wavelength pass bands of light therethrough and for blocking light having wavelengths outside said pass bands, comprising a first band stop filter for blocking light having wavelengths less than 430 nanometers, a second band stop filter for blocking light having wavelengths between approximately 460 and 510 nanometers, a third band stop filter for blocking light having wavelengths between approximately 530 and 590 nanometers, and a fourth band stop filter operative to block light having wavelengths between approximately 620 and 680 nanometers.

13. A filter as in claim 12 wherein the filtering layers applied to said substrates define alternating high and low refractive indices and alternating thicknesses.

14. A filter as in claim 12 further comprising an infrared filter.

15. A filter for permitting good seeing and good color differentiation, while simultaneously preventing damage to an eye by exposure to unwanted radiation, said filter comprising at least one substrate and a plurality of layers of refractive materials secured to said substrate, said refractive material being selected to block selected wavelengths of light impinging on said filter and for permitting transmission of other wavelengths therethrough, said filter blocking all light impinging on said filter except for a plurality of narrow pass bands of light wavelength, each said pass band defining a width of less than approximately 50 nanometers as measured at approximately 50% maximum radiation, the pass bands being spaced approximately equally about a CIE chromaticity diagram.

16. A filter as in claim 15 wherein the filter transmits three pass bands centered respectively at approximately 445-450 nanometers, approximately 520-530 nanometers and approximately 610 nanometers.

17. A filter as in claim 16 wherein the bands define widths of approximately 10-20 nanometers measured at approximately one-half the maximum radiation of each of said bands.

* * * * *